US012705656B2

(12) United States Patent
Kurisu et al.

(10) Patent No.: US 12,705,656 B2
(45) Date of Patent: Aug. 11, 2026

(54) INFORMATION PROCESSING DEVICE, INFORMATION PROCESSING METHOD, AND PROGRAM

(71) Applicant: JAPAN TOBACCO INC., Tokyo (JP)

(72) Inventors: Toshiharu Kurisu, Tokyo (JP); Shin Watanabe, Tokyo (JP); Yoshiyuki Habashima, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 269 days.

(21) Appl. No.: 18/276,511

(22) PCT Filed: Feb. 4, 2022

(86) PCT No.: PCT/JP2022/004497
§ 371 (c)(1),
(2) Date: Aug. 9, 2023

(87) PCT Pub. No.: WO2022/172877
PCT Pub. Date: Aug. 18, 2022

(65) Prior Publication Data

US 2024/0311890 A1 Sep. 19, 2024

(30) Foreign Application Priority Data

Feb. 10, 2021 (JP) ................................ 2021-019602

(51) Int. Cl.
*G06Q 30/00* (2023.01)
*G06Q 30/0601* (2023.01)

(52) U.S. Cl.
CPC ..... *G06Q 30/0623* (2013.01); *G06Q 30/0631* (2013.01); *G06Q 30/0641* (2013.01)

(58) Field of Classification Search
CPC ........... G06Q 30/0623; G06Q 30/0631; G06Q 30/0641
See application file for complete search history.

(56) References Cited

U.S. PATENT DOCUMENTS 8,429,027 B2 * 4/2013 Zheng .................... G06Q 10/40 705/26.7
10,977,710 B2 * 4/2021 Axelsson ........... G06Q 30/0631
(Continued)

FOREIGN PATENT DOCUMENTS

JP 2015-035189 A 2/2015

OTHER PUBLICATIONS

"Grapevine: A Wine Prediction Algorithm Using Multi-dimensional Clustering Methods," by Richard Diehl Martinez, Geoffrey Angus, and Rooz Mahdavian, arXiv:1807.00692 [cs. IR], Jun. 29, 2018 (Year: 2018).*

(Continued)

*Primary Examiner* — Anne M Georgalas
(74) *Attorney, Agent, or Firm* — Oliff PLC

(57) ABSTRACT

A first display control means controls a display to display first phrases/words that indicate a flavor or aroma of a first object, the first phrases/words being obtained from a first expression group recorded in a database for the first object. A second display control means controls the display to display second phrases/words obtained from a second expression group recorded in the database in association with the selected first phrases/words. A third display control means controls the display to display information related to the first phrases/words selected by the user or the second object recorded in the database in association with the second phrase/word displayed by the second display control. By displaying the related information, the second object is recommended to the user.

14 Claims, 10 Drawing Sheets

(56) References Cited

U.S. PATENT DOCUMENTS

| | | | | |
|---|---|---|---|---|
| 2007/0104832 | A1* | 5/2007 | Tomlinson | G06Q 30/02 426/15 |
| 2012/0226698 | A1* | 9/2012 | Silvestre | G06Q 30/02 707/E17.084 |
| 2013/0339163 | A1* | 12/2013 | Dumontet | G06Q 30/0631 705/15 |
| 2015/0262401 | A1* | 9/2015 | Zes | G06T 11/60 345/636 |
| 2016/0019885 | A1* | 1/2016 | Romano | G06F 40/109 704/9 |
| 2017/0010247 | A1* | 1/2017 | Tompkins | G01N 33/146 |
| 2018/0032948 | A1* | 2/2018 | Alvarez | C12L 11/00 |
| 2018/0094304 | A1* | 4/2018 | Andrews | C12Q 1/6876 |

OTHER PUBLICATIONS

"Grapevine: A Wine Prediction Algorithm Using Multi-dimensional Clustering Methods," by Richard Diehl Martinez, Geoffrey Angus, and Roozbeh Mahdavian, ARXIV ID: 1807.00692, Jun. 29, 2018 (Year: 2018).*

Apr. 26, 2022 International Search Report issued in International Patent Application No. PCT/JP2022/004497.

Apr. 26, 2022 Written Opinion of the International Searching Authority issued in International Patent Application No. PCT/JP2022/004497.

Dec. 6, 2024 extended Search Report issued in European Patent Application No. 22752701.7.

* cited by examiner

| ID | 001 | 002 | 003 |
| --- | --- | --- | --- |
| SET NAME | IBARAKI | MIYAGI | ··· |
| 1 | AME TSUKUBA | URASUMI | ··· |
| 2 | NAMAZAKE HOKYO | HIDAKAMI | ··· |
| 3 | TAKEO | ··· | ··· |
| 4 | SATO NO HOMARE | ··· | ··· |
| 5 | CHI | ··· | ··· |
| 6 | KOHAKU | ··· | ··· |

FIG. 4

| AME TSUKUBA | | | | | | |
|---|---|---|---|---|---|---|
| CHARACTERISTICS | REFRESHING | | FULL | | WARM | |
| | 2 | | 4 | | 1 | |
| FLAVOR EXPRESSION | WATER SPINACH | 1 | SHIMEJI MUSHROOM | 4 | BLACKCHERRY | 2 |
| | JAPANESE CHERVIL | 1 | PEANUT | 1 | | |
| | | | SOYBEAN FLOUR | 2 | | |
| | | | BEECH TREE | 1 | | |
| | | | MUSHROOM | 1 | | |
| | | | CHESTNUT PASTE | 1 | | |
| METAPHOR EXPRESSION | SUNLIGHT FILITERING THROUGH GREEN TREES | | FANTASTIC RURAL LANDSCAPE<br>ELEGANT MORNING SUNSHINE<br>SKY OF THE HOMETOWN | | | |

Figure 7:
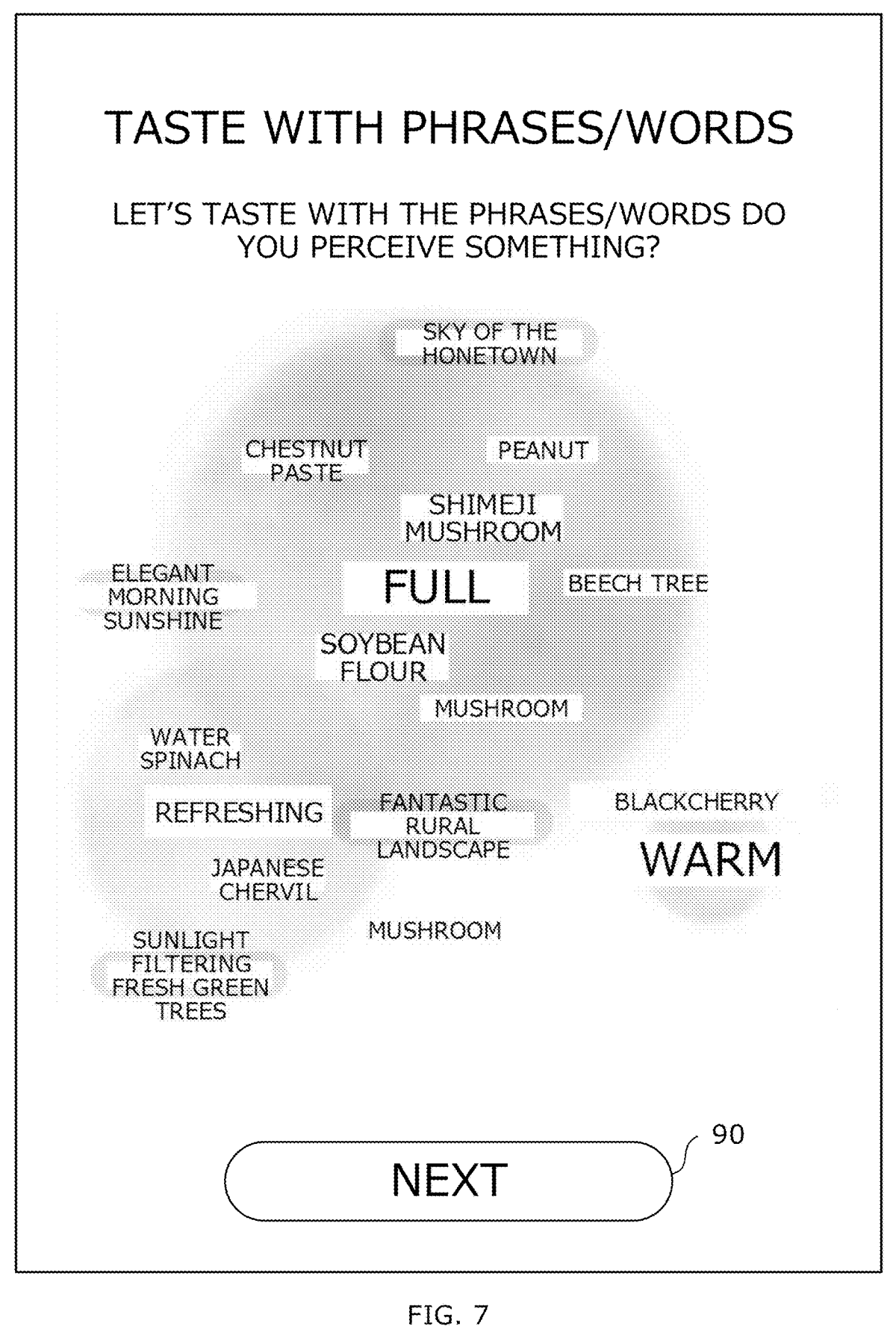

TASTE WITH PHRASES/WORDS

LET'S TASTE WITH THE PHRASES/WORDS DO YOU PERCEIVE SOMETHING?

SKY OF THE HONETOWN

CHESTNUT PASTE

PEANUT

SHIMEJI MUSHROOM

ELEGANT MORNING SUNSHINE

FULL

BEECH TREE

SOYBEAN FLOUR

MUSHROOM

WATER SPINACH

REFRESHING

FANTASTIC RURAL LANDSCAPE

BLACKCHERRY

WARM

JAPANESE CHERVIL

MUSHROOM

SUNLIGHT FILTERING FRESH GREEN TREES

NEXT

| SECOND PHRASE/WORD (ABSTRACT EXPRESSION) | FIRST PHRASE/WORD (FLAVOR OR METAPHOR) |
|---|---|
| SWEET | CHESTNUT PASTE |
| | SOYBEAN FLOUR |
| | HONEY |
| | . . . |
| FRUITY | WHITE GRAPE |
| | LITCHI |
| | GUAVA |
| | . . . |
| FRUITY | BEECH TREE |
| | WATER SPINACH |
| . . . | . . . |
| . . . | . . . |
| . . . | . . . |

FIG. 10

RESULTS

HYORI BREWERY
(IBARAKI)
AME TSUKUBA

KEYWORDS YOU PERCIEVE FROM THE WINE

YOU SEEMS TO LIKE

SWEET AND FRUITY WINE

WE RECOMMEND THE FOLLOWING:

JUNMAI YOSHIDA
AKITA
CHESTNUT PASTE, FRAGRANT

JUNMAI DIGINJO MATSURI
YAMAGUCHI
BLACKCHERRY, LITCHI

SEE MORE RECOMMENDATION

INFORMATION PROCESSING DEVICE, INFORMATION PROCESSING METHOD, AND PROGRAM

TECHNICAL FIELD

This invention relates to a technique for expressing in language a flavor or aroma of an object.

RELATED ART

Techniques for visually representing user preferences are known. For example, Patent Document 1 discloses a technique for representing a user's preference by arranging a history of the user's search content in a two-dimensional coordinate system that includes a time axis.

PRIOR ART

Patent Document

Patent Document 1: JP 2015-035189A

SUMMARY

Problem to be Solved

This invention provides a technique for expressing in language a flavor or aroma of an object that is difficult for a user to perceive and evaluate, and for presenting another object to the user.

Solution

According to an aspect of the disclosure, there is provide an information processing device including: an accessing means that accesses a database in which a first expression group and a second expression group are recorded in association with each other, the first expression group including a plurality of first phrases/words that indicate a flavor or aroma of each of an object, the second expression group including a plurality of second phrases/words that indicate the flavor or aroma of each of the object; a first display control means that controls a display means to display a plurality of the first phrases/words that indicate the flavor or aroma of a first object obtained from the first expression group recorded in the database; a receiving means that receives a selection of phrases/words, from among a plurality of the first phrases/words, displayed corresponding to a flavor or an aroma perceived by a user when using the first object; a second display control means that controls the display means to display the second phrases/words recorded in the database and obtained from the second expression group corresponding to the selected first phrases/words; and a third display control means that controls the display means to display information related to a second object recorded in the database in association with the selected first phrases/words or the displayed second phrases/words.

In a case that the object is recorded in the database in association with each of the selected first phrase/words and the displayed second phrase/words, the third display control means may control the display means to display the related information with the object recorded in association with the selected first phrases/words as the second object.

In a case that a plurality of the second objects are recorded in the database in association with the selected first phrases/words or the displayed second phrases/words, the third display control means may extract the second object to be displayed, in accordance with a determined priority.

The priority may be determined by a rank in accordance with an order of the phrases/words selected by the user from among the displayed plurality of the first phrases/words.

The receiving means may receive an input showing a preference of the user with respect to the first object, and the priority may be determined by a rank in accordance with the preference input by the user.

In the database, the second expression group may include an expression group classified and recorded in accordance with an attribute of a user, and the second display control means may control the display means to display the second phrases/words obtained from the second expression group in association with the attribute of the user recorded in the database.

In the database, the second expression group may include expression groups classified in accordance with a time or place when or where the object is used, and the second display control means may control the display means to display the second phrases/words obtained from the second expression group in association with the time or place when or where the first object is used.

According to another aspect of the disclosure, there is provided an information processing method including: accessing a database in which a first expression group and a second expression group are recorded in association with each other, the first expression group including a plurality of first phrases/words that indicate a flavor or aroma of each of an object, the second expression group including a plurality of second phrases/words that indicate the flavor or aroma of each the object; controlling a display means to display a plurality of the first phrases/words that indicate the flavor or aroma of a first object obtained from the first expression group recorded in the database; receiving a selection of phrases/words, from among a plurality of the first phrases/words, displayed corresponding to a flavor or an aroma perceived by a user when using the first object; controlling the display means to display the second phrases/words recorded in the database and obtained from the second expression group corresponding to the selected first phrases/words; and controlling the display means to display information related to a second object recorded in the database in association with the selected first phrases/words or the displayed second phrases/words.

According to yet another aspect of the disclosure, there is provided a non-transitory computer-readable storage medium storing a program for causing a computer to execute a process, the process including: accessing a database in which a first expression group and a second expression group are recorded in association with each other, the first expression group including a plurality of first phrases/words that indicate a flavor or aroma of each of an object, the second expression group including a plurality of second phrases/words that indicate the flavor or aroma of each of the object; controlling a display means to display a plurality of the first phrases/words that indicate the flavor or aroma of a first object obtained from the first expression group recorded in the database; receiving a selection of phrases/words, from among a plurality of the first phrases/words, displayed corresponding to a flavor or aroma perceived by a user when using the first object; controlling the display means to display the second phrases/words recorded in the database and obtained from the second expression group corresponding to the selected first phrases/words; and controlling the display means to display information related to a second object recorded in the database in association with the selected first phrases/words or the displayed second phrases/words.

Advantageous Effects

This invention enables a flavor or aroma of an object to be expressed in language and for another object to be presented to a user.

BRIEF DESCRIPTION OF THE DRAWINGS

FIG. 4 shows an example of database 111.

FIG. 5 shows an example of database 112.

FIG. 6 shows an example of a display in client terminal 20.

FIG. 7 shows an example of a display in client terminal 20.

FIG. 10 shows an example of database 113.

DESCRIPTION OF REFERENCE NUMERALS

1 . . . information processing system, 10 . . . server, 12 . . . accessing means, 13 . . . first display control means, 14 . . . display means, 15 . . . second display control means, 17 . . . third display control means, 20 . . . client terminal, 90 . . . operator 101 . . . . CPU, 102 . . . memory, 104 . . . communication IF, 111 . . . database, 112 . . . database, 201 . . . . CPU, 202 . . . memory, 204 . . . communication IF, 205 . . . input device, 206 . . . output device.

DETAILED DESCRIPTION

1. Configuration

Figure 1:
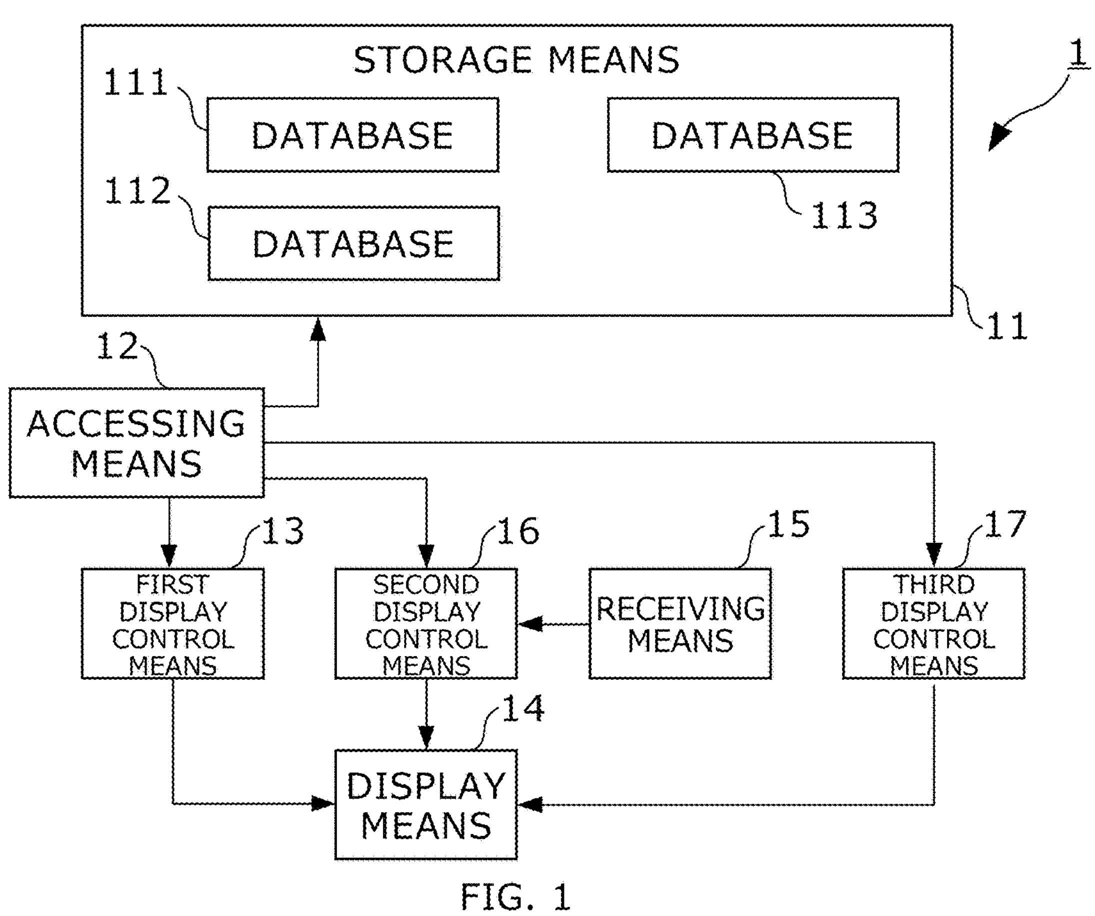
FIG. 1 shows an exemplary functional configuration of information processing system 1 according to an embodiment.

FIG. 1 shows an exemplary functional configuration of an information processing system 1 according to an embodiment. Information processing system 1 is a system that receives for an object input of a flavor or aroma that is perceived by a user upon use of the object, and that recommends another object to the user based on the input. Here, the object is, for example, a Japanese rice wine (sake) or the like, which is used (here, by being drunk) by the user who perceives its flavor or aroma.

Information processing system 1 includes storage means 11, accessing means 12, first display control means 13, display means 14, receiving means 15, second display control means 16, and third display control means 17. Storage means 11 stores various data and programs. In this example, storage means 11 stores databases 111, 112 and 113. According to the present invention, databases 111, 112 and 113 constitute an exemplary database. Accessing means 12 accesses databases 111,112 and 113 to read and acquire data.

Database 111 includes a plurality of records. Each record corresponds to a set of objects and includes an identifier for the set and an identifier for each object included in the set. Database 112 is a database that records, for each of the plurality of objects, a first expression group that includes a plurality of first phrases/words indicative of a flavor or aroma of the object. Database 113 is a database that records, for each of a plurality of objects, a second expression group that includes a plurality of second phrases/words indicative of a flavor or aroma of the object. The second phrases/words included in the second expression group are phrases/words that have a more abstract meaning than the first phrases/words included in the first expression group. Otherwise stated, the first phrases/words included in the first expression group are phrases/words that have a more specific meaning than the second phrases/words included in the second expression group. In database 113, the second phrases/words included in the second expression group and the first phrases/words included in the first expression group have a one-to-many correspondence relationship. That is, the number of the second phrases/words included in the second expression group is smaller than the number of the first phrases/words included in the first expression group. However, the in first expression group and the second expression group are not limited to the relationships exemplified in this embodiment, and may have a different correspondence with each other.

Display means 14 displays a variety of image information. First display control means 13 controls display means 14 to display a plurality of first phrases/words indicative of a flavor or aroma of the first object obtained from the first expression group recorded in database 112 for the first object. Receiving means 15 receives a selection of phrase/word, from among the plurality of displayed first phrases/words, that corresponds to the flavor or aroma perceived by the user using the first object.

Second display control means 16 controls display means 14 to display the second phrases/words obtained from the second expression group recorded in association with the selected first phrases/words in database 113.

Third display control means 17 controls display means 14 to display, in databases 112 and 113, related information which is related to the first phrase/word selected by the user or the second object recorded in association with the second phrases/words displayed by second display control means 16. By displaying the related information, the second object is recommended to the user. If the object is recorded in databases 112 and 113 in association with each of the first phrase/word selected by the user or the second phrase/word displayed by second display control means 16, third display control means 17 controls display means 14 to display related information on the object recorded in association with the first phrase/word selected by the user as the second object.

Figure 2:
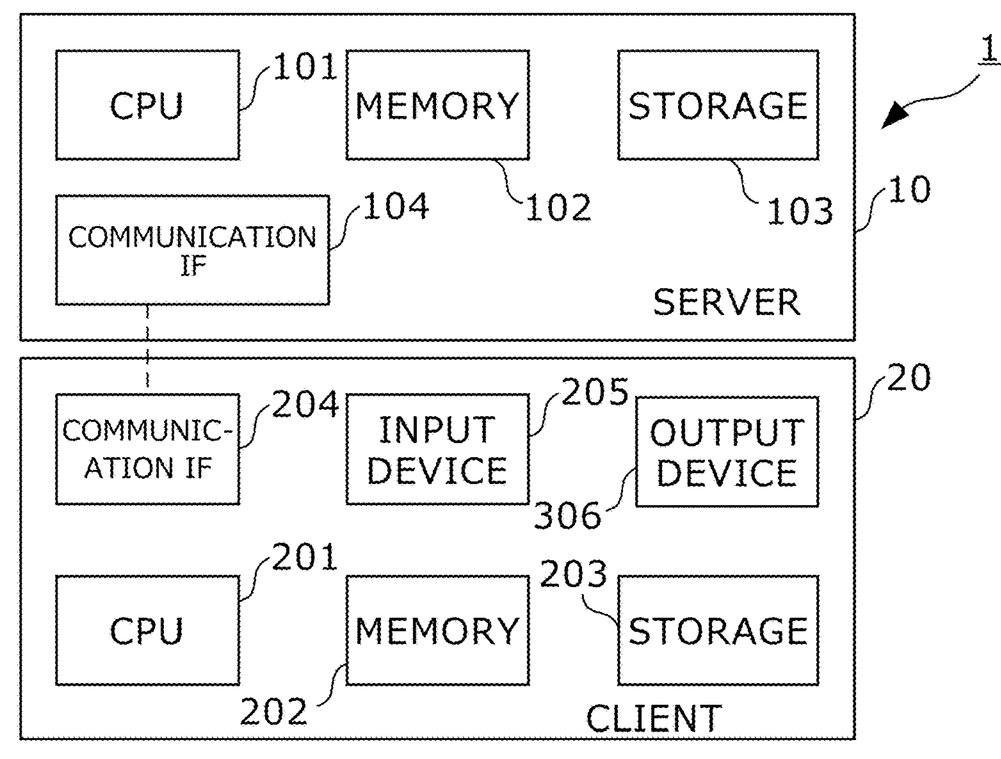
FIG. 2 shows an exemplary hardware configuration of information processing system 1.

FIG. 2 shows an exemplary hardware configuration of information processing system 1. In this example, information processing system 1 includes server 10 and client terminal 20. Server 10 is an information processing device or a computer device having CPU 101, memory 102, storage 103, and communication IF 104. CPU 101 is a processor that performs various operations in accordance with a program. Memory 102 is a main storage device that functions as a work area when CPU 101 executes a program, and includes, for example, a RAM (Random Access Memory). Storage 103 is an auxiliary storage device that stores various types of data/programs, and includes at least one of an SSD (Solid State Drive) and a HDD (Hard Disk Drive). Communication IF 104 is a device that communicates with other devices in accordance with a predetermined standard (e.g., Ethernet), and includes, for example, an NIC (Network Interface Card).

In this example, the program stored in storage 103 includes a program (hereinafter referred to as a "server program") that causes a computer device to function as a server for information processing system 1. When CPU 101 executes the server program, the functions shown in FIG. 1 are implemented in the computer device. When CPU 101 executes the server program, at least one of the memory 102 and the storage 103 is an example of storage means 11, and CPU 101 and the communication IF104 are an example of first display control means 13, receiving means 15, second display control means 16, and third display control means 17.

Client terminal 20 is an information processing device or a computer device including CPU 201, memory 202, storage 203, communication IF 204, input device 205, and output device 206; more specifically, for example, a smart phone, a tablet device, or a personal computer. CPU 201 is a processor that performs various operations in accordance with a program. Memory 202 is a main storage device that functions as a work area when CPU 201 executes the program, and includes, for example, a RAM. Storage 203 is an auxiliary storage device for storing various data and programs, and includes, for example, an SSD. Communication IF 204 is a device that communicates with other devices in accordance with a predetermined standard (for example, LTE (Long Term Evolution) or WiFi (registered trademark), and includes, for example, an LTE antenna and a chipset. Input device 205 is a device for inputting data or an instruction to client terminal 20, and includes, for example, at least one of a touch screen, a keyboard, and a microphone. Output device 206 is a device for outputting information, and includes, for example, a display and a speaker.

In this example, the program stored in the storage 203 includes a program (hereinafter referred to as a "client program") that causes a computer device to function as a client terminal 20 for information processing system 1. The client program is a general-purpose web browser or a dedicated application program. When CPU 201 executes the client program, the function shown in FIG. 1 is implemented at the computer device. When CPU 201 executes the client program, the output device 206 is an example of display means 14.

2. Operation

Figure 3:
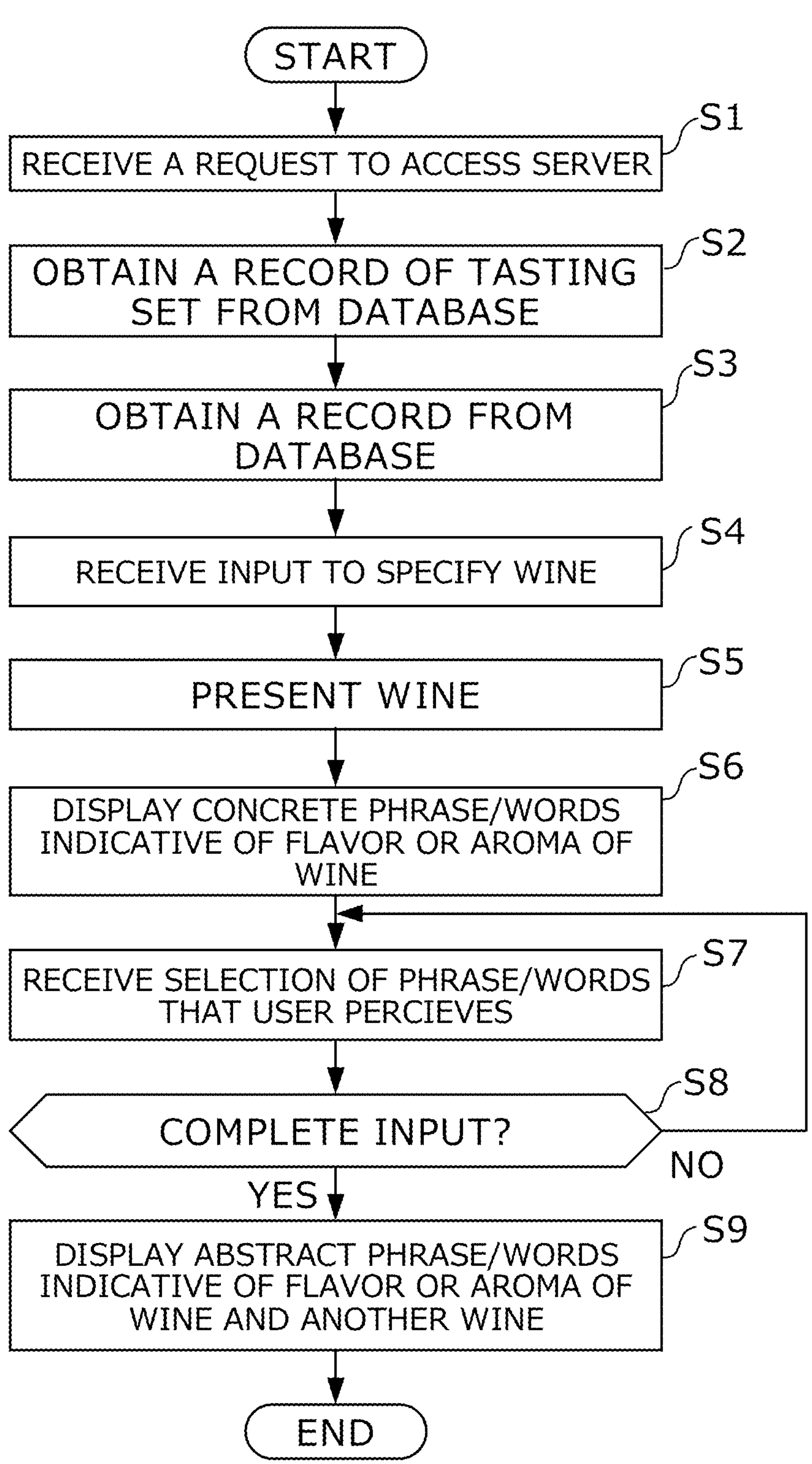
FIG. 3 is a flowchart showing an operation of information processing system 1.

FIG. 3 shows a flowchart illustrating an operation of information processing system 1. Here, an operation of information processing system 1 is described assuming the following use case. In this example, the object is a (food or) beverage, and the object is (either eaten for) drunk. First, a retailer sells to a user a Japanese rice wine tasting set as the (food/) beverage. The retailer may operate as a mail order sales service or as an in-person sales service. The tasting set consists of six types of Japanese rice wine, and includes a leaflet. The leaflet includes a URL for the service site of the information processing system 1 described in the form of a two-dimensional image code (specifically, a QR code (registered trademark)), for example. To access the service site provided by the server 10, the user who has purchased the tasting set uses his/her smartphone (an example of client terminal 20) to read the two-dimensional image code (at his/her home). In the following description, functional elements such as storage means 11 may be described as a subject of processing, in which case a hardware element such as a CPU 101 that executes software such as a server program cooperates with other hardware elements to execute the processing.

At step S1, server 10 receives from client terminal 20 a request to access the service site. The access request includes an ID of the tasting set. In information processing system 1, as described above, storage means 11 stores database 111. In database 111, the ID of the tasting set and information for identifying a Japanese rice wine included in the tasting set are recorded prior to the flow operation shown in FIG. 3.

FIG. 4 shows an example of database 111. Database 111 includes a plurality of records. Each record corresponds to a single tasting set and includes a set name or name of the tasting set and information identifying a brand of Japanese rice wine included in the tasting set. For example, the record in the leftmost column of the figure shows that the tasting set of ID "001" has the set name "Ibaraki Prefecture," and that the tasting set includes six types of Japanese rice wine: "Ame Tsukuba," "Namazake Hokyo," "Takeo," "Sato no Homare," "Chi," and "Kohaku." Further, although not shown, database 111 or another database may record information on other attributes of the Japanese rice wines, for example, a place of production (prefecture name), a manufacturer's name, pricing, link to a mail order website, and the like.

Referring again to FIG. 3, at step S2, accessing means 12 accesses database 111 and obtains a record of the tasting set having the same ID as the ID included in the access request received from client terminal 20. At step S3, accessing means 12 accesses database 112 and obtains phrases/words indicating a flavor or aroma of all Japanese rice wines included in the tasting set.

FIG. 5 shows an example of database 112. Database 112 includes a plurality of records. Each record corresponds to a Japanese rice wine and includes a numerical value that indicates a strength (for example, a flavor intensity) of a correlation between a Japanese rice wine and predetermined phrases/words. The phrases/words recorded in database 112 are the first phrases/words included in the first expression group in the present disclosure, and are classified into three categories: "characteristics," "flavor (expression)," and "metaphor (expression)."

Characteristics is the upper classification in this example, and includes three elements: "refreshing," "full," and "warm." A numerical value indicating a ratio of these three elements is recorded in database 112. To avoid a case in which the ratios of all the elements are equal, the sum of the numerical values indicating the ratios of the three elements is set to a value that is not divisible by 3, for example, 7. In addition, to make it easier to identify a dominant element among the three elements, only one element among the three elements has a maximum value. For example, a ratio of refreshing: full: warm=3:3:1 is not used, since such a ratio does not make clear which of the elements refreshing and full is dominant. The sum of the values is common for all Japanese rice wines (i.e. the total value of the three elements for all Japanese rice wines is 7). For example, the ratio for Japanese rice wine "Ame Tsukuba" is refreshing: full: warm=2:4:1, and that for Japanese rice wine "Takeo" is refreshing: full: warm=5:1:1.

Characteristics

Flavor expressions are used to describe a flavor or aroma present in a Japanese rice wine by use of names of foods or plants such as pineapple, lemon, and apple, for example. In database 112, an intensity of each flavor or aroma present in a Japanese rice wine is recorded. A flavor or aroma that is not perceived in a Japanese rice wine is indicated as null (i.e., effectively, no flavor or aroma is recorded). A flavor or aroma that is perceived in a Japanese rice wine is recorded by being assigned a numerical value that is indicative of an intensity of the flavor or aroma. Assigned numerical values are relative, with "1" being indicative of a weakest perceived flavor or aroma. The stronger a perception of a flavor or aroma, the higher the denoted value is. Several flavors or aromas may be perceived within one type of Japanese rice wine. Each of a plurality of flavors or aromas may be perceived within (i.e., associated with) a single characteristic. For example, the flavor/aroma "water spinach" belongs to the characteristic "refreshing" and the flavor "shimeji mushroom" belongs to the characteristic "full." In the illustrated embodiment, the Japanese rice wine "Ame Tsukuba" has value "1" for the flavors of water spinach, Japanese chervil, peanuts, beech trees, mushrooms, and chestnut bean paste, a value "2" for soybean flour and black cherries, and a value "4" for shimeji mushroom. Unlike characteristics, there is no limit for the sum of the values of flavor expressions.

Metaphor expressions express a flavor or aroma of a Japanese rice wine by use of descriptive phrases, such as "sunset over the gulf coastline," "tropical beach," or "memories of first love." The expression data includes at least one metaphor expression for each brand of Japanese rice wine. At least one metaphor expression is recorded in database 112 for a Japanese rice wine. Each metaphor contains adjectives. In the example of the Japanese rice wine "Ame Tsukuba" the following three phrases/words are given as metaphor expressions: "sunlight filtering through fresh green trees" for the characteristic "Refreshing;" and three phrases "fantastic rural landscape," "elegant morning sunshine," and "sky of the hometown" for characteristic "fullness." No phrase/word is recorded for characteristic "warm." In this example, intensity for the metaphor expression is not included in the database.

The values and phrases/words recorded in database 112 are respectively numerical and linguistic expressions of a flavor or aroma that a particular professional or a small number of professionals (e.g., Japanese rice wine sommeliers) perceived after tasting a Japanese rice wine.

Referring again to FIG. 3, the user specifies a target Japanese rice wine (an example of the first object in the present disclosure) to be used by the user, for example, by inputting into client terminal 20 any one of the brands of Japanese rice wine included in the tasting set. Here, it is assumed that the Japanese rice wine of "Ame Tsukuba" is specified. At step S4, receiving means 15 receives an input by the user specifying the Japanese rice wine "Ame Tsukuba."

Figure 6:
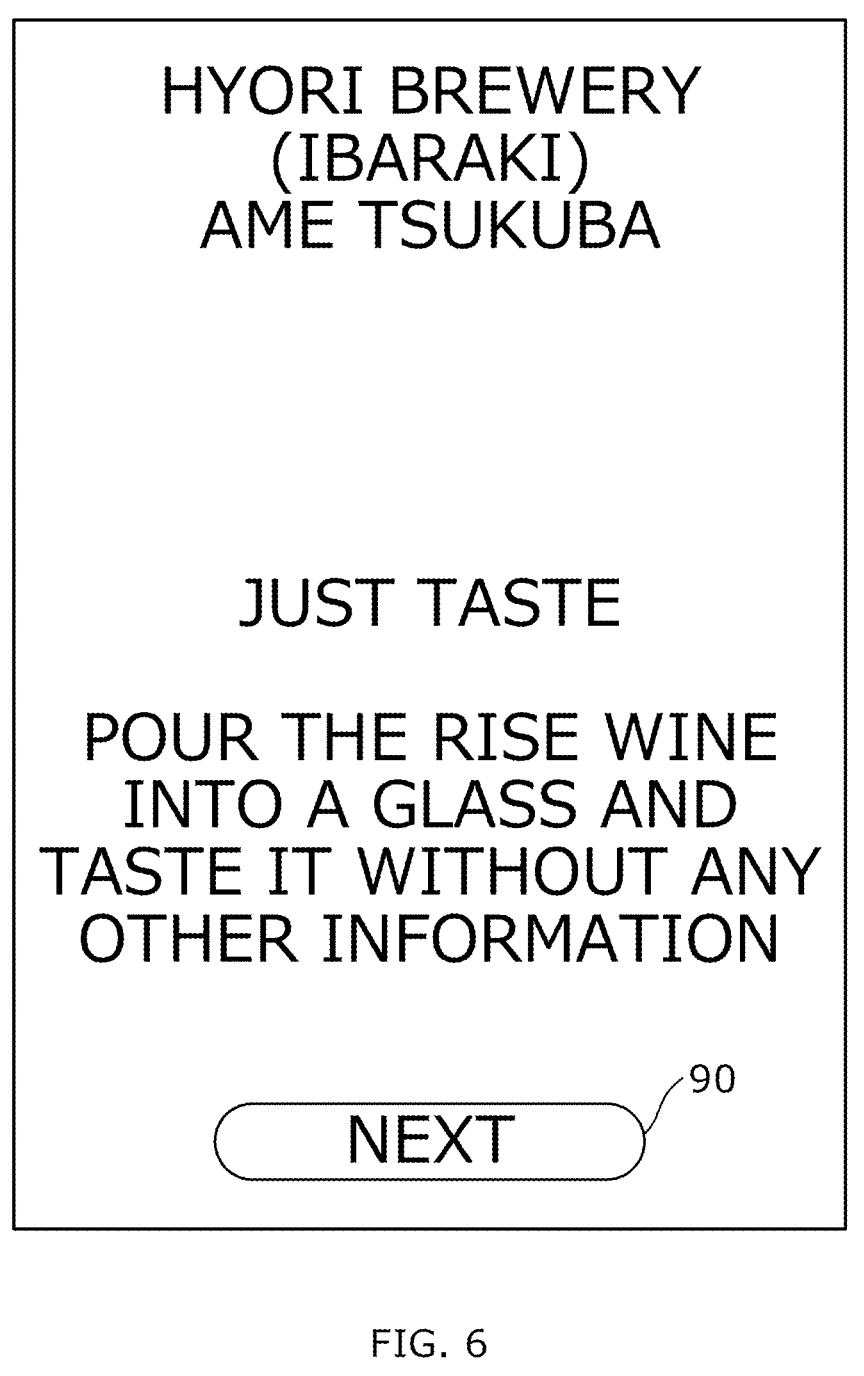

At step S5, first display control means 13 presents a Japanese rice wine, which is the first object, to the user and prompts the user to drink the Japanese rice wine. Specifically, first display control means 13 controls display means 14 of client terminal 20 to display an image as shown in FIG. 6, for example. In the example shown in FIG. 6, the brand "Ame Tsukuba" of the Japanese rice wine, which is the first object, along with other attributes are displayed, and further, a message "Pour the rise wine into a glass and taste it without any other information" is displayed. It is note that "first display control means 13, second display control means 16, or third display control means 17 causes display means 14 to display information or image" refers to transmit the information or image to client terminal 20, and to display at client terminal 20 the information or image in accordance with the data received from server 10.

Responsive to this message, the user drinks the Japanese rice wine "Ame Tsukuba" and perceives its flavor or aroma. Then, when the user selects the operator image 90 "Next" shown in FIG. 6, then at step S6 shown in FIG. 3, first display control means 13 controls display means 14 to display a plurality of phrases/words (the phrases/words included in characteristics, flavor expression, and metaphor expressions described above) indicative of the flavor or aroma of the Japanese rice wine "Ame Tsukuba." The plurality of phrase/word are obtained from the first expression group recorded in database 112 for the Japanese rice wine that is the first object.

FIG. 7 shows a plurality of phrases/words indicative of the flavor or aroma of Japanese rice wine "Ame Tsukuba." These phrases/words are displayed on a flavor map. The flavor map includes a graphic that depicts a balance of the elements defined in the characteristics of the Japanese rice wine "Ame Tsukuba."

Figure 8:
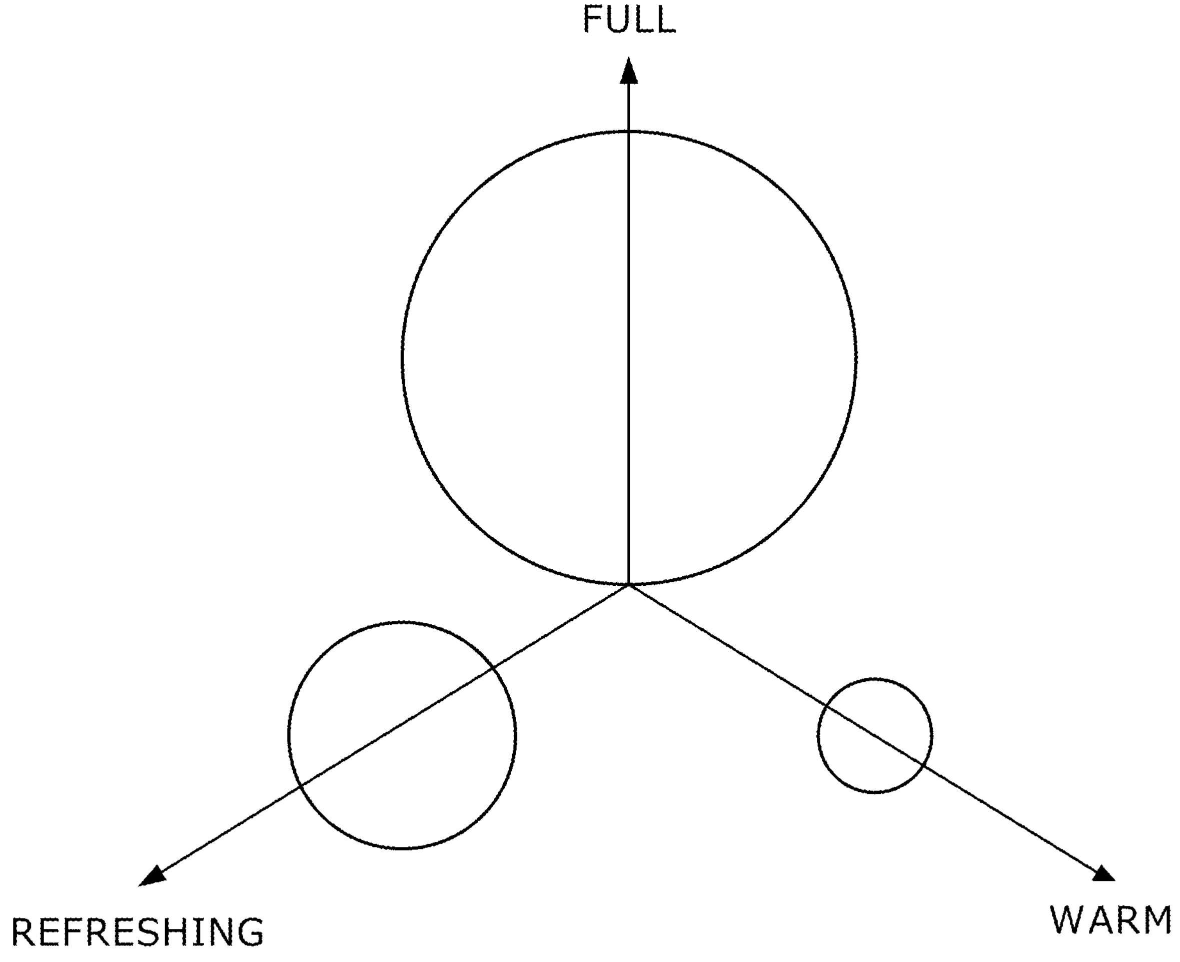
FIG. 8 shows an exemplary structure of a flavor map.

FIG. 8 shows an exemplary structure of a flavor map. In the flavor map, an axis corresponding to an element constituting a characteristics is set. In this case, three axes are set: a "refreshing" axis, a "full" axis, and a "warm" axis. Each axis is set to be equal in a direction of rotation relative to the origin of the flavor map, i.e. at an angle of 120° relative to each other in this example. A strength of each element is depicted by a size of a circle centered on a reference point (a different point from the origin) set for each axis. In one example, if refreshing: full: warm=2:4:1, the radii of the circles depicted in the flavor map are refreshing: full: warm=2:4:1. Each circle of each element is depicted in a different color.

Referring again to FIG. 7, in the flavor map, flavor expression phrases/words are superimposed on a graphic that shows a balance of characteristics elements. In one example, flavor expression phrases/words are placed in the circles of respective characteristics elements, and the greater the strength the larger and the closer to the center of the circle the flavor expression phrases/words are relatively displayed. The circumferential position or angular position of a phrase/word in the circle is predetermined for each flavor expression. Alternatively, an angle may be determined in accordance with a number of flavor expressions included in the characteristics element of the Japanese rice wine "Ame Tsukuba" (specifically, for example, a plurality of phrases/words are arranged at a regular circumferential interval).

In the flavor map, the phrase/word of the metaphor expression are displayed above the figure showing the balance of the characteristics elements. In one example, the phrase/word of the metaphor expression are displayed with an appearance (specifically, in a typeface, color, size, decorative form, or a combination thereof) that differs from that of the phrase/word of a flavor expression. The metaphor expression is arranged, for example, outside or on the circumference of the circle of the characteristics element.

Figure 9:
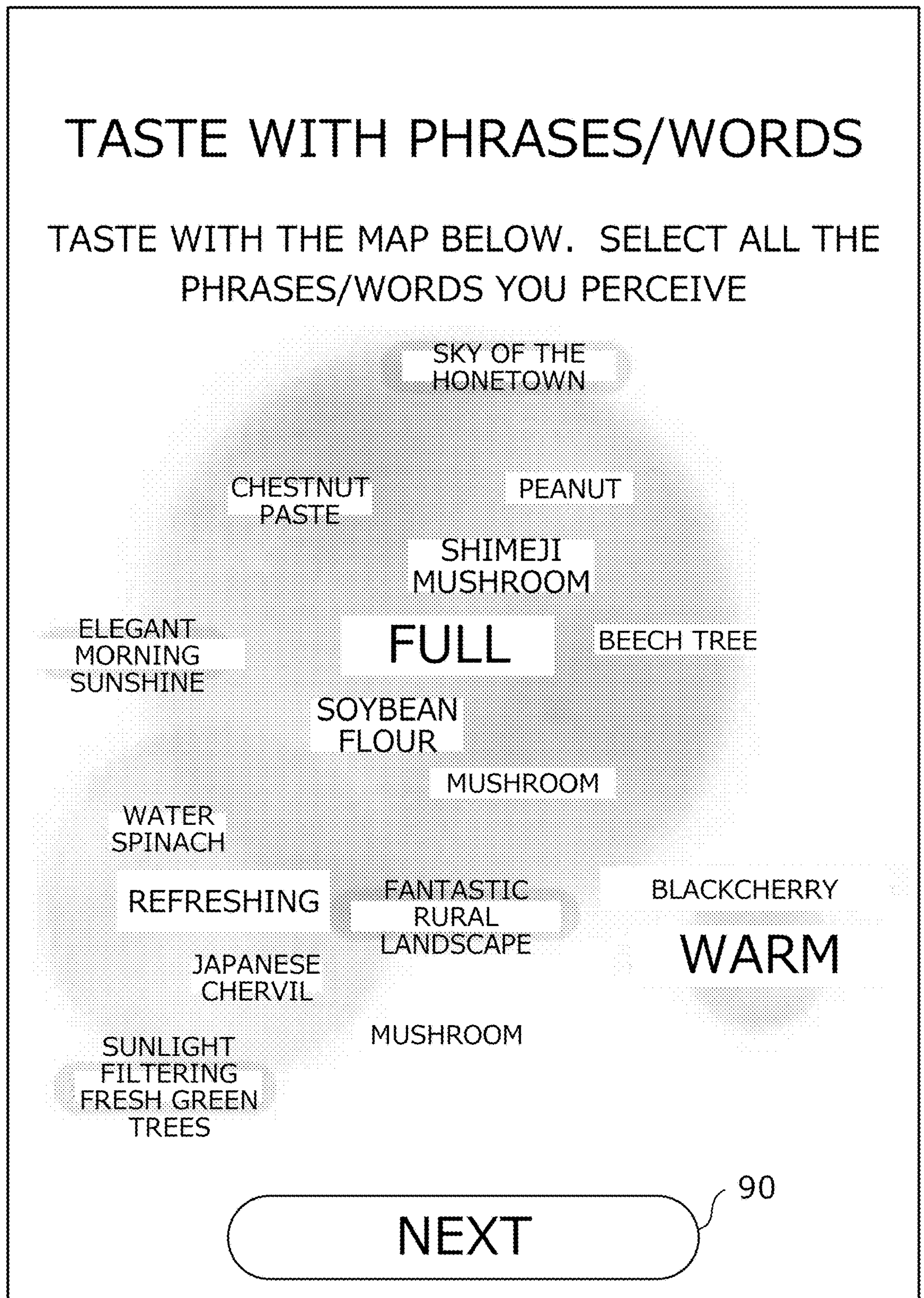
FIG. 9 shows an example of a display in client terminal 20.

In the example shown in FIG. 7, a message "Let's taste with the phrases/words. Do you perceive something?" is displayed. Responsive to this message, the user again drinks the Japanese rice wine "Ame Tsukuba" while referring to the phrase/word indicating the flavor or aroma of the Japanese rice wine "Ame Tsukuba." Then, when the user selects the operator image 90 "Next" shown in FIG. 7, first display control means 13 controls display means 14 to display a message "Please select all of the phrases/words displayed in the flavor map that represent what you perceived when drinking" while displaying a plurality of phrase/word indicating the flavor or aroma of the Japanese rice wine "Ame Tsukuba" as shown in FIG. 9.

The user selects on the flavor map one or more phrases/words that are close to the flavor or aroma that he/she perceived when drinking the Japanese rice wine "Ame Tsukuba." Since users' sense of flavor or taste differs, for example, even if an expert has determined that the Japanese rice wine "Ame Tsukuba" contains eight flavors or aromas, such as water spinach, Japanese chervil, peanuts, beech tree, mushrooms, chestnut bean paste, soybean flour, black cherries, and pastilles and these flavor expressions are recorded in database 112, another user may not perceive all of these eight flavors or aromas. For example, if multiple users drink the same Japanese rice wine "Ame Tsukuba," each of the users may perceive different flavors or aromas, for example, one user perceives only the flavor of beech tree and another user perceives the flavor of soybean flour and chestnut bean paste. Here, selection of a plurality of phrase/word indicating the flavor or aroma of Japanese rice wine "Ame Tsukuba" is performed, for example, by a user touching a position where a word is displayed on the touch screen.

At step S7 in FIG. 3, receiving means 15 receives selection of phrases/words that closely represents the flavor or aroma the user perceived when drinking the Japanese rice wine "Ame Tsukuba." Here, it is assumed that three phrases "chestnut bean paste," "soybean flour," and "black cherry" are selected. If the user selects these phrases in FIG. 9 and selects the operator image 90 "Next," at step S8 shown in FIG. 3, first display control means 13 determines (at step S8; YES) that the input by the user is completed.

At step S9, second display control means 16 controls display means 14 to display more abstract phrases/words indicative of the flavor or aroma of the Japanese rice wine "Ame Tsukuba," and third display control means 17 controls display means 14 to display information related to another Japanese rice wine recommended to the user. Specifically, second display control means 16 controls display means 14 to display phrases/words (second phrases/words in the present invention) that are recorded in database 113 in association with the phrase/word (first phrase/word) selected by the user.

FIG. 10 shows an example of database 113. In database 113, phrases/words (first phrases/words) corresponding to a flavor expression or a metaphor expression (first expression group) in database 112 and phrases/words (second phrases/words) corresponding to a more abstract expression (second expression group) than the first phrases/words are recorded in association with each other. These phrases/words (second phrases/words) represent a flavor or aroma of Japanese rice wine using a description such as "sweet" or "fruity."

In this case, since the three phrases "chestnut bean paste," "soybean flour," and "black cherry" (the first phrases/words) are selected by the user, the word "sweet" corresponding to "chestnut bean paste" and "soybean flour" and the word "fruity" corresponding to "black cherry" are displayed on the display means 14 according to the example shown in FIG. 10.

Further, third display control means 17 specifies a Japanese rice wine (second object in the present disclosure) recommended to the user. Specifically, third display control means 17 controls display means 14 to display the first phrase/word selected by the user, or information related to Japanese rice wine recorded in association with the second phrase/word displayed by second display control means 16 in databases 112 and 113. In this instance, in database 112, if there is a Japanese rice wine associated with either "chestnut bean paste," "soybean flour" or "Black Cherry" (each is example of first phrase/word), the Japanese rice wine's brand, place of production (prefecture name), manufacturer's name, price, label image, link to mail order site, etc. are displayed as the related information. Further, in database 113, since the phrases/words (the first phrases/words) corresponding to "sweet" or "fruity" (the second word) displayed by second display control means 16 are "chestnut bean paste," "soybean flour," "honey," "white grape," "live," or "guava," in database 112, if there is a Japanese rice wine associated with any of "chestnut bean paste," "soybean flour," "honey," "white grape," "live" or "guava," the brand of Japanese rice wine, the place of production (prefecture name), the manufacturer's name, the price, the image of the label, the link to the mail order website, and the like are displayed as the related information.

It is noted that third display control means 17 displays information related to the object corresponding to the first phrases/words ("chestnut bean paste," "soybean flour" or "black cherry") selected by the user when Japanese rice wine is associated with each of the first phrases/words ("chestnut bean paste," "soybean flour," or "black cherry") selected by the user and the displayed second phrases/words ("sweet" or "fruity"). This is because the flavor or aroma perceived by the user is considered to be more directly represented by the first phrases/words selected by the user.

Figure 11:
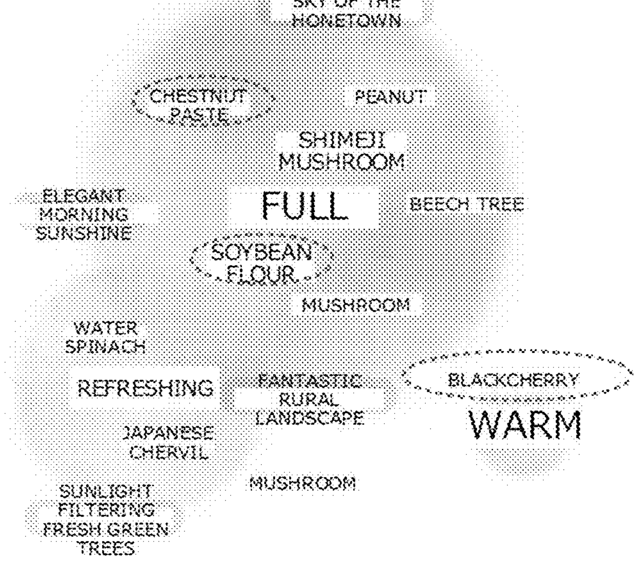
FIG. 11 shows an example of a display in client terminal 20.

Thus, as shown in FIG. 11, the phrases/words "chestnut bean paste," "soybean flour," or "black cherry," which are the phrases/words (first phrases/words) corresponding to the expressions close to the flavor or aroma perceived by the user when drinking the Japanese rice wine "Ame Tsukuba," are displayed so as to be distinguishable from other phrases/words (such as "peanut," "shimeji mushroom," "fullness," and the like), and the phrases/words (second phrases/words) corresponding to the expressions "sweet" and "fruity," which are more abstract expression for "chestnut bean paste," "soybean flour," and "black cherry," are displayed. Further, when a Japanese rice wine is recommended to the user, a brand and production area are also displayed as information related to the Japanese rice wine; with the Japanese rice wine "Junmai Yoshida" associated with the phrase/word "chestnut bean paste," and the Japanese rice wine "Junmai Daiginjo Matsuri" associated with the word "Black Cherry." A link to an EC website for purchasing each Japanese rice wine is associated with a position at which the brands "Junmai Yoshida" and "Junmai Daiginjo Matsuri" are displayed, and the user can purchase the recommended Japanese rice wine by using the link.

The present embodiment enables a user to visualize in language a flavor or aroma of an object that is otherwise difficult for the user to perceive and evaluate, and to then recommend another object that is expressed in phrase/word close to those perceived by the user from the flavor or aroma. Furthermore, by using of a link, the user can easily purchase the recommended object.

3. Modification

The present invention is not limited to the embodiments described above, and various modifications are available. Some variations will be described below. Two or more of the items in the following modifications may be used in combination.

3-1. Priorities for Presenting Objects

In a case that a plurality of Japanese rice wines are extracted as Japanese rice wines to be recommended to the user, third display control means 17 may give priorities for the plurality of Japanese rice wines and display related information of Japanese rice wines in a accordance with an order of the priority. For example, a Japanese rice wine that is not included in the tasting set used by the user may be given a high priority. Alternatively, a Japanese rice wine corresponding to a flavor expression selected by the user ("chestnut bean paste," "soybean flour," and "black cherry" in the exemplary embodiment) may be given a higher priority than other flavor expressions. Still alternatively, a Japanese rice wine having a greater sum of strengths of these flavor expressions may be given a higher priority than other Japanese rice wines. As described above, when a plurality of second objects are recorded in databases 112 and 113 in association with the first phrase/word selected by the user or the second phrases/words displayed by second display control means 16, third display control means 17 may extract the second objects to be displayed in accordance with a determined priority.

The priority may be determined in accordance with any of the phrases/words selected by the user among the plurality of first phrases/words displayed. For example, third display control means 17 may give priorities in accordance with the selection order of first phrases/words selected by the user and display the related information of the second objects associated with the first phrases/words in preference over the selection order. Thus, for example, in a case that the user selects the words "chestnut bean paste," "soybean flour," and "black cherry" in this order as the words that represent the flavor or aroma of the Japanese rice wine "Ame Tsukuba," the related information of Japanese rice wine corresponding to the words "chestnut bean paste" is displayed in preference to the related information of Japanese rice wine corresponding to the sords "soybean flour" or "black cherry" It is noted that to display the related information of a certain object in preference to related information of other objects refers to display only the related information of the certain object, or to display the related information in a position on the display screen where it is easier for the user to see the related information than the other object (the same principle applies hereinafter).

Further, receiving means 15 may receive an input of a preference of the user using the first object, and the priority may be ranked in accordance with a preference input by the user. For example, the preference of a user who drinks a certain Japanese rice wine is entered with three options available, namely, "favorite," "neither," and "dislike," and the user refers to database 112 to determine what flavor or aroma of a Japanese rice wine is most favorable. In a case that a plurality of second objects are recorded in association with the first phrases/words selected by the user or the second phrases/words displayed by second display control means 16, third display control means 17 increases the priority of the object matching the above-described preference.

3-2. Phrases/Words Displayed in Accordance with User Attributes

The second expression group recorded in database 113 may include an expression group classified in accordance with an attribute of the user. For example, the second expression group may be an expression corresponding to an attribute of the user (the attribute is, for example, an animation or a television show that the user likes; the expression is, for example, a speech of a main character of the animation or the drama or a similar expression). Receiving means 15 receives an input of an attribute of the user using the first object, and second display control means 16 causes display means 14 to display the second phrases/words obtained from the second expression group recorded in association with the attribute of the user in database 113. Accordingly, since the second expression group corresponding to the user who uses the first object is displayed, the user can easily understand the meaning of the second expression group.

3-3. Phrases/Words in Accordance with Date and Time or Place

The second expression group recorded in database 113 may include an expression group classified and recorded in accordance with a date and time or place in which the object is used. For example, the second expression group is an expression (for example, an expression corresponding to a time zone such as midnight, or an expression corresponding to a place such as a bar) corresponding to a date and time or a place (for example, a date and time: daytime or midnight, a place: home or a bar) in which the object is used. Receiving means 15 receives an input of a date and time or a place using the first object, and second display control means 16 causes display means 14 to display the second phrases/words obtained from the second expression group recorded in association with the date and time or the place in which the first object is used in the database. As a result, the second expression group corresponding to the environment in which the first object is used is displayed.

3-4. Phrases/Words Displayed on the Flavor Map

The phrase/word displayed on the flavor map are not limited to those illustrated in the embodiments. In the embodiment, characteristics, flavor expressions, and metaphor expressions included in the record of Japanese rice wines are each recorded in database 112. However, not all of the information recorded in database 112 need be displayed on the flavor map, and some of the information may be omitted, or information may be selectively displayed. For example, when selecting items of information to be displayed, first display control means 13 selects a predetermined number of items of information in order of the intensity of the flavor expression (or, when selecting items of information to be omitted, first display control means 13 selects a predetermined number of items in an ascending order of the intensity of the flavor expression). Similarly, not all the information recorded in database 113 need be displayed, and at least some of the information may be omitted, or the information may be selectively displayed.

3-5. Other Embodiments

The method of specifying the service site in information processing system 1 is not limited to the one illustrated in the embodiment. For example, the application program installed in client terminal 20 may include information for specifying a service site, and when the user activates the application program the application program may automatically connect to the service site.

The data structure of database 112 is not limited to that illustrated in the embodiments. For example, an emotional expression may be associated with any one characteristics element. An intensity of metaphorical and sensory expressions may also be recorded in database 112. Further, databases 112 and 113 need not be separate databases, and may be an integrated database.

The object to be processed by the information processing device 1 is not limited to Japanese rice wine, and the object may be an alcoholic beverage other than Japanese rice wine, such as grape wine or beer, or a non-alcoholic beverage, such as coffee, black tea or green tea, a seasoning, such as olive oil or vinegar, a food, such as buckwheat or pasta, or a cosmetic product, such as a perfume or soap.

The display screen shown in the embodiment is merely an example. A part of the image object illustrated in the embodiment may be omitted, or an image object not illustrated may be added.

The functional configuration of information processing system 1 is not limited to that illustrated in the embodiment. The hardware configuration and the correspondence relationship between the hardware configuration and the functional configuration of information processing system 1 are not limited to those illustrated in the embodiment. For example, a plurality of computers may cooperate with each other to function as server 10. Server 10 may be a physical server or a virtual server. In the embodiment, at least a part of the functions described as those of server 10 may be implemented at client terminal 20. In this case, client terminal 20 may function as an "information processing device" of the present invention.

The flowchart illustrated in the embodiment is merely an example. The order of some of the processes may be changed, or some of the processes may be omitted. According to an aspect of the present invention, there may be provided an information processing method including: accessing a database in which a first expression group and a second expression group are stored in association with each other, the first expression group including a plurality of first phrase/word that indicate a flavor or aroma of each of an object, the first expression group including a plurality of first phrase/word that indicate the flavor or aroma of each of the object, the second expression group including a fewer number of phrase/word than the first expression group; controlling a display means to display the first phrase/word that indicate the flavor or aroma of a first object, the first phrase/word being obtained from the first expression group corresponding to the first object in the database; receiving an input from a user for selection of phrase/word from among the displayed first phrase/word after using the first object; controlling the display means to display second phrase/word obtained from the second expression group corresponding to the selected first phrase/word; controlling the display means to display related information corresponding to the selected first phrase/word or the displayed second phrase/word in the database.

A program executed by a processor such as a CPU 101 may be provided in a state of being recorded in a computer-readable recording medium such as a CD-ROM (Compact Disc Read Only Memory), or may be provided in a state of being downloadable via a network such as the Internet. According to an aspect of the present invention, there may be provided a program that causes a computer to execute a process, the process including: accessing a database in which a first expression group and a second expression group are stored in association with each other, the first expression group including a plurality of first phrase/word that indicate a flavor or aroma of each of an object, the first expression group including a plurality of first phrase/word that indicate a flavor or aroma of each of the object, the second expression group including a fewer number of phrase/word than the first expression group; controlling a display means to display the first phrase/word indicating the flavor or aroma of a first object, the first phrase/word being obtained from the first expression group corresponding to the first object in the database; receiving an input from a user for selection of phrase/word from among the displayed first phrase/word after using the first object; controlling the display means to display second phrase/word obtained from the second expression group corresponding to the selected first phrase/word; controlling the display means to display related information corresponding to the selected first phrase/word or the displayed second phrase/word in the database.

The invention claimed is:

1. An information processing device comprising:

a processor configured to:

obtain a record from a database having records, each respective record being for a respective object, and each respective record including a first expression group and a second expression group recorded in association with each other, wherein the first expression group includes a plurality of first phrases/words that indicate a first flavor or first aroma of the respective object in the record, the first phrases/words being classified into categories including a first category and a second category, and each first phrase/word of the second category being associated with a respective first phrase/word of the first category, the second expression group includes a plurality of second phrases/words that indicate a second flavor or second aroma of the respective object in the record, in which the second flavor is different from the first flavor and the second aroma is different from the first aroma, and each record includes respective values that indicate a strength of a correlation between the respective object of the record and each of the first phrases/words of the first category and the second category;

control a display to display, on a map, a plurality of the first phrases/words that indicate the first flavor or first aroma of a first object obtained from the first expression group recorded in the database, each first phrase/word of the plurality of the first phrases/words relating to the first object, wherein each of the first phrases/words of the first category corresponds to an axis in the map, the strength of the correlation between the first object and each of the first phrases/words of the first category is depicted by a size of a respective area in relation to the corresponding axis in the map, each first phrase/word of the second category is superimposed on the area corresponding to the first phrase/word of the first category that is associated with the first phrase/word of the second category, each first phrase/word of the second category being positioned according to the strength of the first phrase/word of the second category;

receive, on the map, a selection of phrases/words, from among the displayed plurality of the first phrases/words corresponding to a flavor or an aroma perceived by a user when using the first object;

control the display to display the second phrases/words recorded in the database and obtained from the second expression group corresponding to the selected first phrases/words; and control the display to display information related to a second object recorded in the database in association with the selected first phrases/words or the displayed second phrases/words.

2. The information processing device according to claim 1, wherein in a case that the second object is recorded in the database in association with each of the selected first phrases/words and the displayed second phrases/words, the processor controls the display to display the related information with the second object recorded in association with the selected first phrases/words.

3. The information processing device according to claim 1, wherein in a case that a plurality of the second objects are recorded in the database in association with the selected first phrases/words or the displayed second phrases/words, the processor extracts the second object to be displayed, in accordance with a determined priority.

4. The information processing device according to claim 3, wherein the received selection of phrases/words includes a plurality of the first phrases/words and the priority is determined by a rank in accordance with an order of the phrases/words selected by the user from among the displayed plurality of the first phrases/words.

5. The information processing device according to claim 3, wherein the processor receives an input showing a preference of the user with respect to the first object, and the priority is determined by a rank in accordance with the preference input by the user.

6. The information processing device according to claim 1, wherein in the database, the second expression group includes an expression group classified and recorded in accordance with an attribute of a user, and the processor controls the display to display the second phrases/words obtained from the second expression group in association with the attribute of the user recorded in the database.

7. The information processing device according to claim 1, wherein in the database, the second expression group includes expression groups classified in accordance with a time or place when or where the object is used, and the processor controls the display to display the second phrases/words obtained from the second expression group in association with the time or place when or where the first object is used.

8. The information processing device according to claim 1, wherein each respective object is a Japanese rice wine.

9. The information processing device according to claim 8, wherein each of the first phrases/words of the first category is a characteristic describing the respective object, and each of the first phrases/words of the second category is a flavor expression describing the respective object.

10. The information processing device according to claim 9, wherein for each record, the first category consists of three first phrases/words, the axes corresponding to the three phrases/words have an angle of 120° relative to each other, and each area associated with a respective first phrase/word of the first category is a circle centered on a reference point on the respective axis.

11. The information processing device according to claim 10, wherein the greater the strength, the larger and the closer to the center of the circle the first phrases/words of the second category are relatively displayed.

12. The information processing device according to claim 11, wherein each of the respective is a non-negative integer.

13. An information processing method performed by a processor comprising:

obtaining a record from a database having records, each respective record being for a respective object, and each respective record including a first expression group and a second expression group recorded in association with each other, wherein the first expression group includes a plurality of first phrases/words that indicate a first flavor or first aroma of the respective object in the record, the first phrases/words being classified into categories including a first category and a second category, and each first phrase/word of the second category being associated with a respective first phrase/word of the first category, the second expression group includes a plurality of second phrases/words that indicate a second flavor or second aroma of the respective object in the record, in which the second flavor is different from the first flavor and the second aroma is different from the first aroma, and each record includes respective values that indicate a strength of a correlation between the respective object of the record and each of the first phrases/words of the first category and the second category;

controlling a display to display, on a map, a plurality of the first phrases/words that indicate the first flavor or first aroma of a first object obtained from the first expression group recorded in the database, each first phrase/word of the plurality of the first phrases/words relating to the first object, wherein each of the first phrases/words of the first category corresponds to an axis in the map, the strength of the correlation between the first object and each of the first phrases/words of the first category is depicted by a size of a respective area in relation to the corresponding axis in the map, each first phrase/word of the second category is superimposed on the area corresponding to the first phrase/word of the first category that is associated with the first phrase/word of the second category, each first phrase/word of the second category being positioned according to the strength of the first phrase/word of the second category;

receiving, on the map, a selection of phrases/words, from among the displayed plurality of the first phrases/words corresponding to a flavor or an aroma perceived by a user when using the first object;

controlling the display to display the second phrases/words recorded in the database and obtained from the second expression group corresponding to the selected first phrases/words; and controlling the display to display information related to a second object recorded in the database in association with the selected first phrases/words or the displayed second phrases/words.

14. A non-transitory computer-readable storage medium storing a program for causing a computer to execute a process, the process comprising:

obtaining a record from a database having records, each respective record being for a respective object, and each respective record including a first expression group and a second expression group recorded in association with each other, wherein the first expression group includes a plurality of first phrases/words that indicate a first flavor or first aroma of the respective object in the record, the first phrases/words being classified into categories including a first category and a second category, and each first phrase/word of the second category being associated with a respective first phrase/word of the first category, the second expression group includes a plurality of second phrases/words that indicate a second flavor or second aroma of the respective object in the record, in which the second flavor is different from the first flavor and the second aroma is different from the first aroma, and each record includes a respective values that indicate a strength of a correlation between the respective object of the record and each of the first phrases/words of the first category and the second category;

controlling a display to display, on a map, a plurality of the first phrases/words that indicate the first flavor or first aroma of a first object obtained from the first expression group recorded in the database, each first phrase/word of the plurality of the first phrases/words relating to the first object, wherein each of the first phrases/words of the first category corresponds to an axis in the map, the strength of the correlation between the first object and each of the first phrases/words of the first category is depicted by a size of a respective area in relation to the corresponding axis in the map, each first phrase/word of the second category is superimposed on the area corresponding to the first phrase/word of the first category that is associated with the first phrase/word of the second category, each first phrase/word of the second category being positioned according to the strength of the first phrase/word of the second category;

receiving, on the map, a selection of phrases/words, from among the displayed plurality of the first phrases/words corresponding to a flavor or an aroma perceived by a user when using the first object;

controlling the display to display the second phrases/words recorded in the database and obtained from the second expression group corresponding to the selected first phrases/words; and controlling the display to display information related to a second object recorded in the database in association with the selected first phrases/words or the displayed second phrases/words.

* * * * *